United States Patent [19]
Kim

[11] Patent Number: 5,999,374
[45] Date of Patent: Dec. 7, 1999

[54] DAMPER FOR THE VOICE COIL MOTOR OF A HARD DISK DRIVE

[75] Inventor: Yun-Tae Kim, Anyang-shi, Rep. of Korea

[73] Assignee: SamSung Electronics Co., Ltd., Suwon, Rep. of Korea

[21] Appl. No.: 09/104,112

[22] Filed: Jun. 25, 1998

[30] Foreign Application Priority Data

Jul. 4, 1997 [KR] Rep. of Korea ........................ 97-30984

[51] Int. Cl.$^6$ ....................................................... G11B 5/55
[52] U.S. Cl. ............................................................ 360/106
[58] Field of Search .................................. 360/97.02, 106

[56] References Cited

U.S. PATENT DOCUMENTS 5,677,813  10/1997  Yoshida ..................................... 360/106

Primary Examiner—A. J. Heinz
Attorney, Agent, or Firm—Robert E. Bushnell, Esq.

[57] ABSTRACT

A voice coil motor using the damper of the present invention is provided in a hard disk drive. The hard disk drive may be constructed using a cover, a base that may be coupled with the cover, and a voice coil motor. The voice coil motor may be constructed using an upper yoke and a lower yoke that are connected to the base of the hard disk drive. A damper is engaged with at least one bore that is formed in the upper yoke of said voice coil motor. The damper is an elastic body that tightly abuts both the upper surface of the upper yoke and the inner surface of the cover.

24 Claims, 5 Drawing Sheets

DAMPER FOR THE VOICE COIL MOTOR OF A HARD DISK DRIVE

CLAIM OF PRIORITY

This application makes reference to, incorporates the same herein, and claims all rights accruing thereto under 35 U.S.C. § 119 through my patent application entitled VCM Damper in Hard Disk Drive earlier filed in the Korean Industrial Property Office on Jul. 4, 1997 and there duly assigned Ser. No. 1997/30984.

BACKGROUND OF THE INVENTION

1. Field of the Invention

The present invention relates to hard disk drives and, more specifically, to a damper for a voice coil motor that is positioned between the upper yoke of a voice coil motor and the cover of a hard disk drive.

2. Background Art

Hard disk drives are widely used as auxiliary memory devices in computer systems to magnetically record data received as a recording apparatus for magnetically recording data received from an external device, such as a host computer, onto a magnetic recording medium, such as a rotating disk, or reading data that has already been recorded on the disk. The hard disk drive includes a housing that has a base and an attached cover, a mechanism unit having a spindle motor for rotatably mounting the magnetic disk, a head for reading and writing data onto the magnetic disk, an actuator and a voice coil motor for controlling the position of the head, and a circuit unit for performing the electrical process and controlling the overall operation of the mechanism unit.

A hard disk drive has a magnetic head attached at the end of an actuator arm that moves over the hard disk drive to read and write information from the disk. The actuator pivots radially around a shaft on a pivot bearing controlled by a voice coil motor. The voice coil motor may have a damper on it that is secured using adhesive to the upper surface of the upper yoke of the voice coil motor. The disk is rotated at high speed by a spindle motor that is attached to the base oft hard disk drive. While the magnetic head writes or reads data from a predetermined track of the disk, the rotation of the disk causes the magnetic head to be hydrodynamically lifted over the surface of the disk by an air bearing. This hydrodynamic lifting results from the flow of air produced by the rotating disk. This air flow causes the magnetic head to float (fly) above the disk surface and allows the head to move over the disk while maintaining a minute gap. During operation, when the hard disk drive is non-operational or during a power down period, the head of the actuator arm is held in position over a parking zone located on the innermost track on the disk. The purpose of adjusting the actuator arm during periods when the disk is not rotating is to prevent data recorded on the disk from being damaged by the magnetic head slapping against the data surface of the disk.

The hard disk drive also uses a flexible printed circuit board that is connected via a signal cable to the magnetic head and a current terminal of the voice coil motor. The cover of the hard disk drive, any gaskets, and any dampers for a voice coil motor are used to control vibrations that may effect the operation of the hard disk drive.

However, because the hard disk drive is very sensitive to shock and noise, the use of adhesive for sealing the hard disk drive tends to be minimized to prevent adhesive-induced outgassing. Furthermore, the damper for a voice coil motor mentioned above is arbitrarily positioned by an operator that determines the correct position for the damper on the upper yoke, using a jig. The jig cannot be reused due to adhesive-induced contamination, thus resulting in unnecessary resource consumption.

As such, I believe that it may be possible to improve on the art of voice coil motor damping by providing a voice coil motor, that does not require the use of an adhesive, that reduces the vibration of the voice coil motor, that reduces the amount of waste generated during the hard disk drive manufacturing process, that is reusable, and that improves the performance of a hard disk drive.

SUMMARY OF THE INVENTION

Accordingly, it is an object of the present invention to provide an improved damper for a voice coil motor.

It is another object to provide a damper for a voice coil motor that does not require the use of an adhesive.

It is still another object to provide a damper for a voice coil motor that reduces that vibration of the voice coil motor.

It is yet another object to provide a damper for a voice coil motor that reduces the amount of waste generated during the hard disk drive manufacturing process.

It is still yet another object to provide a damper for a voice coil motor that is reusable.

It is a further object to provide a damper for a voice coil motor that improves the performance of a hard disk drive that is undergoing impact disturbances.

To achieve the above objects, a voice coil motor using the damper of the present invention is provided in a hard disk drive. The hard disk drive may be constructed using a cover, a base that may be coupled with the cover, and a voice coil motor. The voice coil motor may be constructed using an upper yoke and a lower yoke that are connected to the base of the hard disk drive. A damper is engaged with at least one bore that is formed in the upper yoke of said voice coil motor. The damper is an elastic body that tightly abuts both the upper surface of the upper yoke and the inner surface of the cover.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
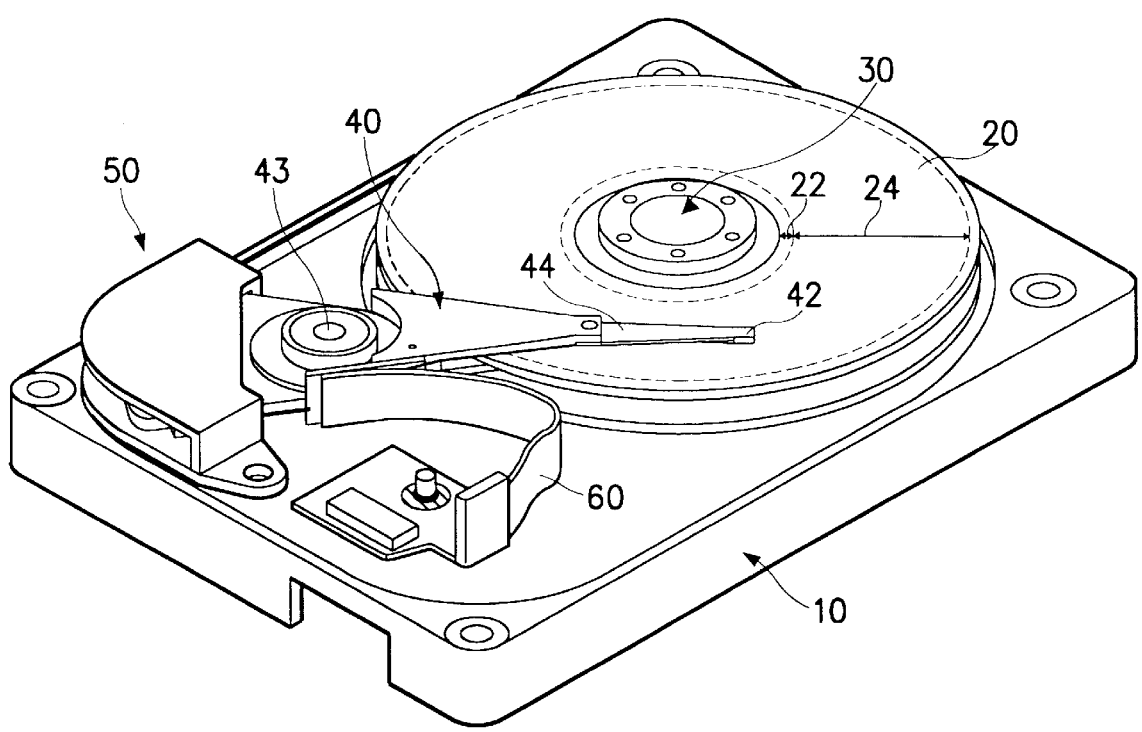
FIG. 1 is a schematic view of a hard disk drive.

Turning now to the drawings, FIG. 1 illustrates a hard disk drive that is constructed using a chassis that is formed using base 10 that is engageable with a gasket (not shown) and a cover (not shown). The chassis encloses spindle motor 30 that supports and rotates disk 20 to allow actuator 40 to read data from the magnetic disk. A voice coil motor controls the position of magnetic head 42. A printed circuit board assembly controls many of the processes of the hard disk drive. Generally, arm 44 supports magnetic head 42 at a predetermined position relative to disk 20 while the disk is being rotated by spindle motor 30 to write and read data from disk 20.

Once the disk 20 is being rotated by spindle motor 30, head 42 "flys" over disk 20 at a low flying height of 1–3 μm and is supported by air pressure that results from the rotation of disk 20 at high speed. In some hard disk drives, these speeds may be in the vicinity of 4500 rpm or higher. The introduction of foreign materials, or contaminants, that are finer than smoke particles between head 42 and disk 20 damages the surface of disk 20 and head 42. Thus, the materials used to construct the hard disk drive must be carefully selected.

Figure 2:
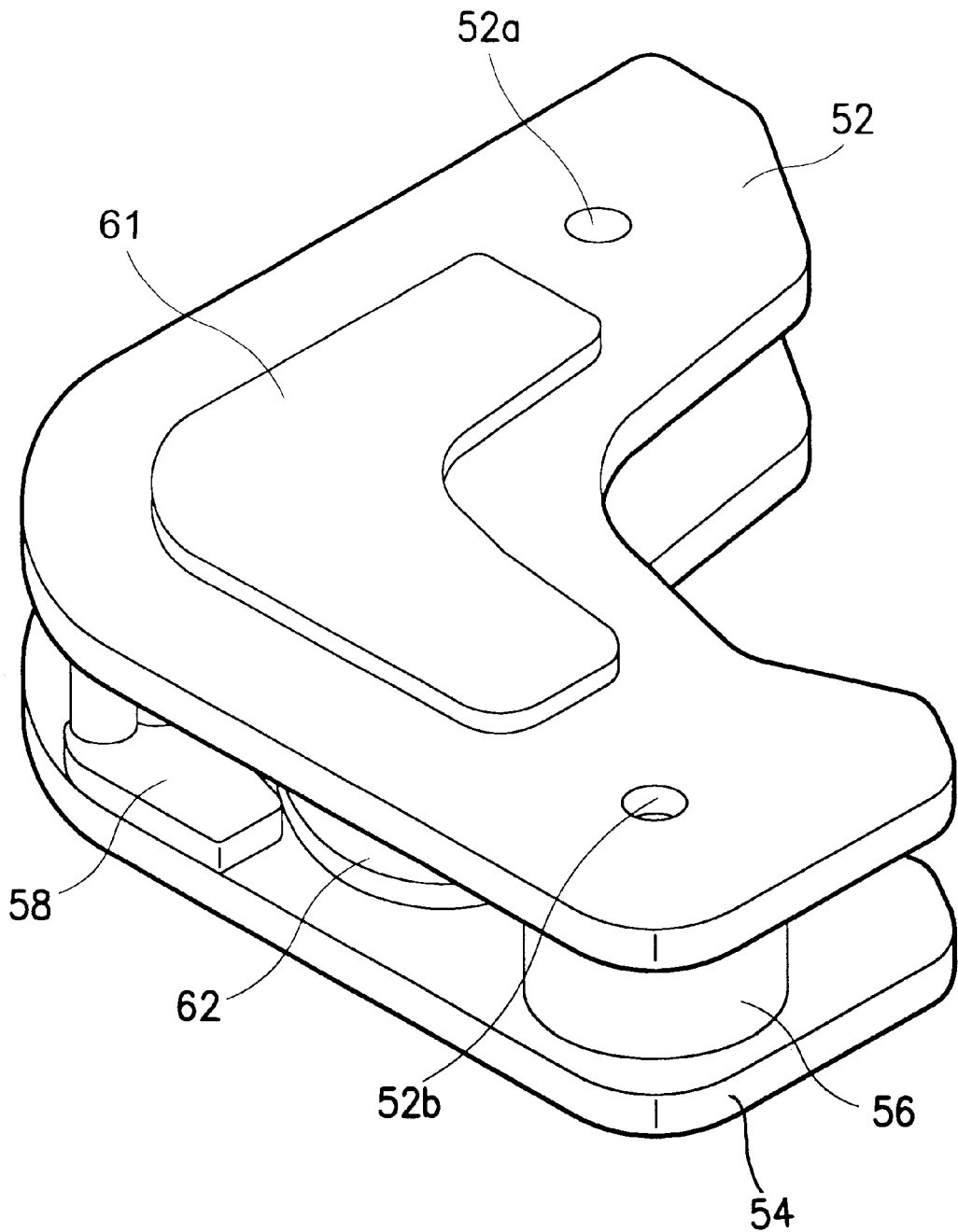
FIG. 2 is a perspective view of a damper for a voice coil motor in a hard disk drive.

A damper for a voice coil motor that is used with a hard disk drive is shown in FIG. 2. Automatic parking latch device 50 with a voice coil motor includes spacers 56 that are positioned between upper yoke 52 and lower yoke 54. A magnet 62 is attached to each yoke. By moving a coil installed on an end of actuator 40 between the magnets of the upper and lower yokes head 42 is moved relative to the disk. FIG. 2 shows a hard disk drive that is sealed by combining a base and a cover to enclose a voice coil motor and rubber plate damper 61 that is secured with adhesive to the upper surface of upper yoke 52 and abutting the inner surface of the cover (not shown). Thus, the damper serves to alleviate shock or vibrations that are imposed on the chassis of the hard disk drive. The damper is shaped to resemble upper and lower yokes 52 and 54, and is firmly bonded to the upper surface of upper yoke 52. During the attachment of damper to the upper yoke, a mark representing the correct placement position for the damper on the upper yoke 52 is made using a jig.

Figure 3:
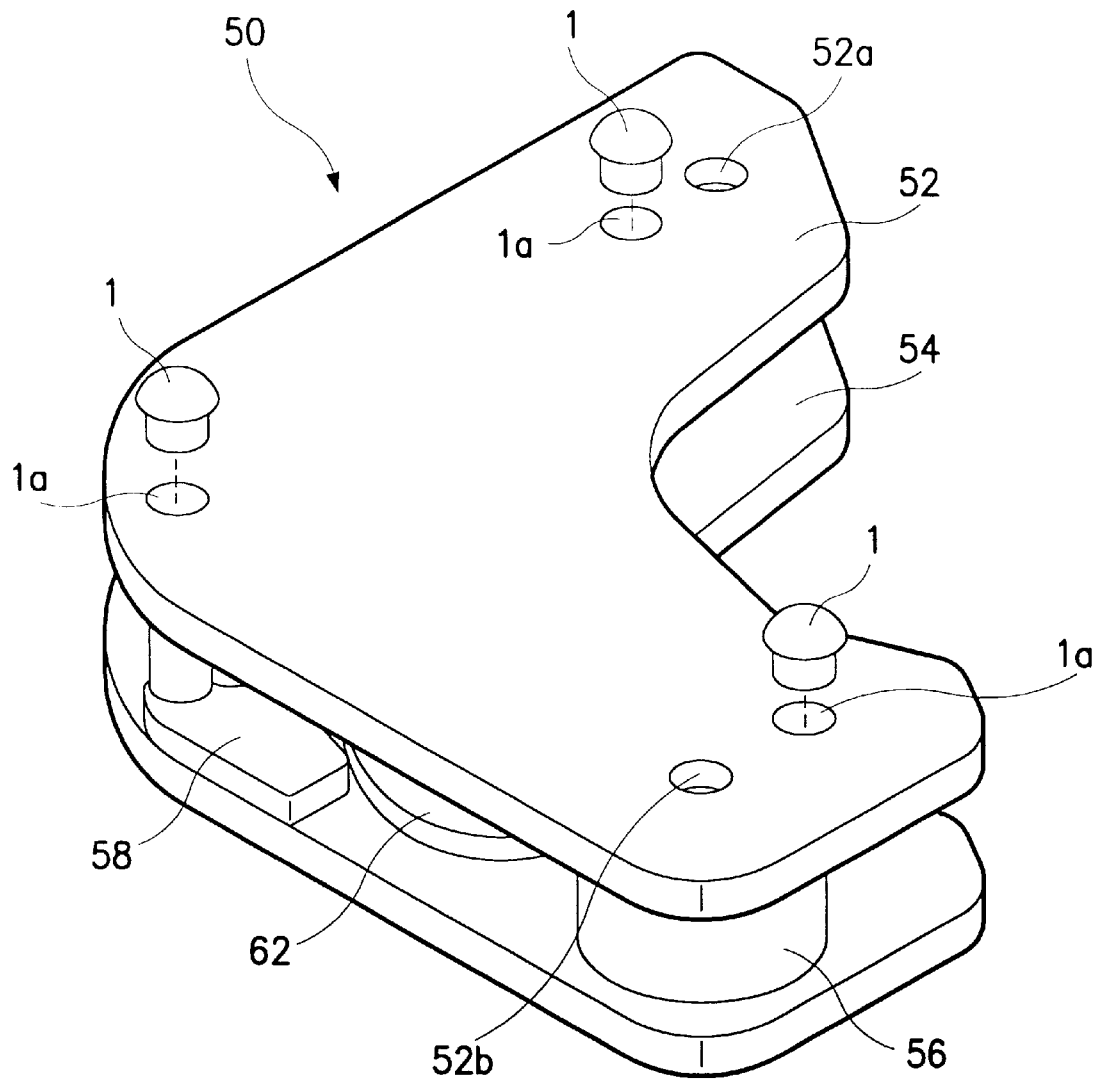
FIG. 3 is a perspective view of a voice coil motor and a damper, as constructed according to the principles of the present invention, that are positioned to cause the damper to abut the cover of the hard disk drive.
Figure 4:
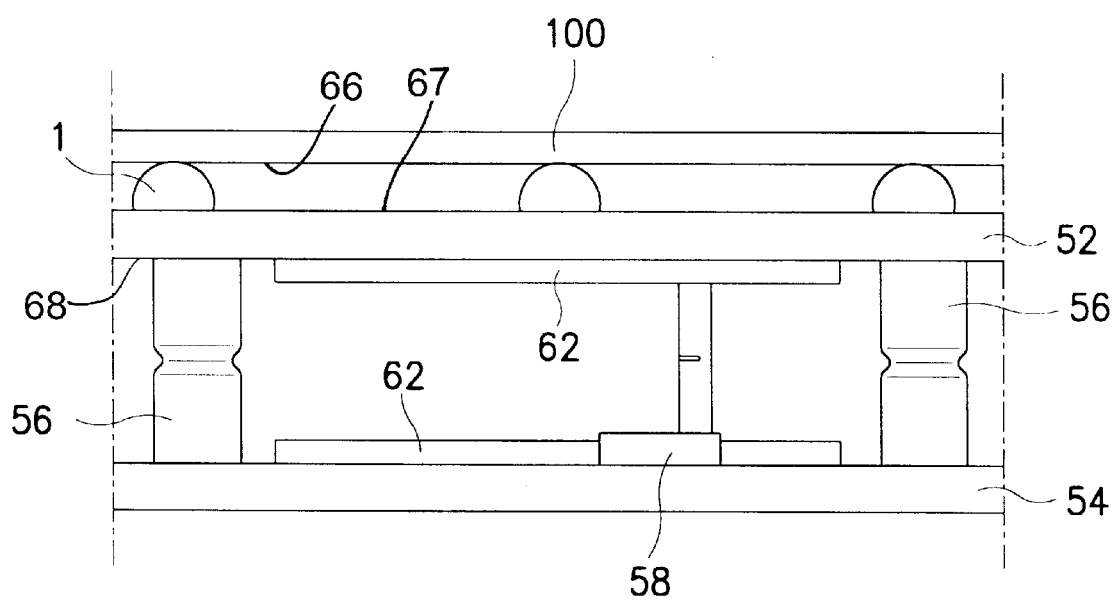
FIG. 4 is a partial frontal view of the damper for a voice coil motor of FIG. 3.

A damper for a voice coil motor as constructed according to the principles of the present invention is shown in FIG. 3. A front view of the damper for a voice coil motor of FIG. 3 is shown in FIG. 4. An automatic parking latch device 50 with a voice coil motor is used in a hard disk drive. The voice coil motor may be constructed using upper yoke 52, lower yoke 54, spacers 56, and magnets 62 that are attached to the upper and lower yokes 52 and 54. By moving the coil positioned on an end of actuator 40 between magnets 62 of upper and lower yokes 52 and 54 around rotational shaft 43, the actuator 40 is can be moved to make contact with latch 58, thereby moving head 42 to a parking zone. Likewise, the voice coil motor can remove the magnetic head from the parking zone. To dampen the vibrations experienced by the hard disk drive, a damper is attached to the upper yoke. To accommodate a damper as constructed according to the principles of the present invention at least one bore is formed in each corner of the upper yoke 52 and elastic screw-shaped damper 1 is inserted into bore 1a. Damper 1 is an independent component having a semi-spherical head and a cylindrical body, that is insertably engaged with bore 1a. When cover 100 is engaged with the base, the head and the body of elastic screw-shaped damper 1 are tightly pressed against bore 1a. As shown in FIG. 4, the top of the head of damper 1 contacts inner surface 66 of cover 100 and the base of the head abuts upper surface 67 of upper yoke 52. Damper 1 is preferably constructed using ethylene propylene diene terpolymer to reduce complications caused by out gassing from the chosen material. The height of the head portion of damper 1 is selected so that after the hard disk drive is assembled, the height of the head has been lowered by compression by anywhere from 3 percent to 50 percent. An optimum amount of compression is probably in the range from approximately 20 percent to approximately 30 percent of the original height of the head portion of the damper prior to being compressed during the assembly of the hard disk drive.

Figure 5:
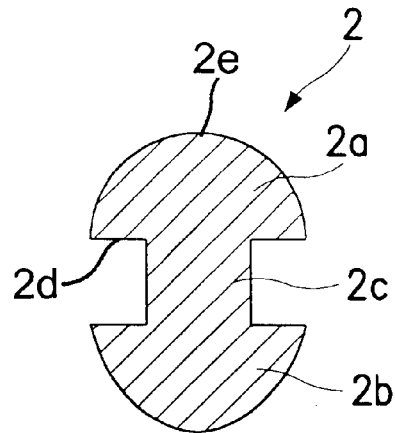
FIG. 5 is a cross-sectional view of a damper for a voice coil motor as constructed according to a second embodiment of the present invention.

A second embodiment of the damper as constructed according to the principles of the present invention is shown in FIG. 5. Damper 2 has semi-spherical head 2a that contacts the inner surface (labeled 66 in FIG. 4) of cover 100 proximate to surface 2e of the damper. Additionally, damper 2 has base head surface 2d that contacts the upper surface (labeled 67 in FIG. 4) of the upper yoke. Cylindrical body 2c is attached to semi-spherical head 2a. Cylindrical body 2c occupies volume defined by the bore in the upper yoke and is also attached to cone-shaped lower portion 2b that projects past the lower surface of the upper yoke. Any of the dampers of the present invention can be manufacture as integral wholes. The length of connecting cylindrical body 2c is equal to the thickness of the upper yoke 52. Thus, when damper 2 is inserted into bore 1a in upper yoke 52, head 2a remains exposed on the upper surface of upper yoke 52, thus damping vibrations. Cylindrical body 2c is fixed in bore 1a and the lower portion 2b projects from the lower surface of upper yoke 52. The shape of the damper 2 facilitates the insertion of damper 2 into bore 1a and facilitates the firm fixing of damper 2 to upper yoke 52.

Figure 6:
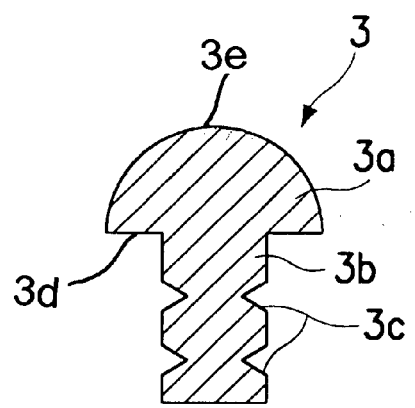
FIG. 6 is a cross-sectional view of a damper for a voice coil motor as constructed according to a third embodiment of the present invention.

A damper as constructed according to a third embodiment of the present invention is shown in FIG. 6. Damper 3 has semi-spherical head 3a that makes contact with the inner surface (labeled 66 in FIG. 4) of the cover proximate to the 3e portion of the head. Damper 3 also has base head surface 3d that makes contact with the upper surface (labeled 67 in FIG. 4) of the upper yoke. Damper 3 also has cylindrical body 3b and at least one groove 3c that is located in a lower portion of the cylindrical body. With a multitude of such grooves, damper 3 generates reliable damping. Groove 3c firmly fixes damper 3 into bore 1a of upper yoke 52. That is, groove 3c absorbs contraction forces that are generated during the insertion of damper 3 into bore 1a due to the material that damper 3 is constructed using.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A hard disk drive, comprising:
  a chassis containing a voice coil motor, said chassis comprising:
    a cover; and
    a base coupled with said cover; said voice coil motor attached to said base, said voice coil motor comprising:
      an lower yoke attached to said base; and
      an upper yoke maintained above said lower yoke in a spaced apart relation, said upper yoke having a bore;

a damper engaged with said bore of said upper yoke of said voice coil motor for maintaining tight contact between said cover and said upper yoke.

2. The hard disk drive of claim 1, further comprised of said damper having an elastic body.

3. The hard disk drive of claim 2, further comprised of said damper having a screw-shape.

4. The hard disk drive of claim 2, further comprised of said damper having a head with a semi-spherical shape for contacting both an inner surface of said cover and an upper surface of said upper yoke, having a cone-shaped lower portion protruding between said upper yoke and said lower yoke, and having a cylindrical body for connecting said semi-spherical head to said cone shaped lower portion, said cylindrical body occupying said bore in said upper yoke of said voice coil motor.

5. The hard disk drive of claim 2, further comprised of said damper having a head with a semi-spherical shape for contacting both an inner surface of said cover and an upper surface of said upper yoke, and a cylindrical body attached to a base of said semi-spherical head, said cylindrical body having at least one circumferential groove in a lower portion thereof.

6. The hard disk drive of claim 2, with said damper having a head contacting both the inner surface of said cover and the upper surface of said upper yoke, said head having a height that is compressed when said cover is attached to said base to enclose said voice coil motor and said damper, said head of said damper being compressed in a range of approximately about 3 percent to approximately about 50 percent of an original height of said head of said damper.

7. The hard disk drive of claim 2, with said damper having a head contacting both the inner surface of said cover and the upper surface of said upper yoke, said head having a height that is compressed when said cover is attached to said base to enclose said voice coil motor and said damper, said head of said damper being compressed in a range of approximately about 20 percent to approximately about 30 percent of an original height of said head of said damper.

8. The hard disk drive of claim 2, further comprised of said damper being integrally constructed as a unitary piece.

9. The hard disk drive of claim 2, further comprised of said damper being constructed of ethylene propylene diene terpolymer.

10. A hard disk drive, comprising:
    a chassis containing a voice coil motor, said chassis comprising:
        a cover; and
        a base coupled with said cover; said voice coil motor attached to said base, said voice coil motor comprising:
            an lower yoke attached to said base; and
            an upper yoke maintained above said lower yoke in a space apart relation, said yoke have said upper yoke having a bore; and
        a damper engaged with said bore of said upper yoke of said voice coil motor for maintaining tight contact between said cover and said upper yoke, said damper having a screw-shape and comprising:
            a body engaged with said bore; and
            a head attached to said body, said head contacting both an upper surface of said upper yoke and an inner surface of said cover.

11. The hard disk drive of claim 10, with said head having a height that is compressed when said cover is attached to said base to enclose said voice coil motor and said damper, said head of said damper being compressed in a range of approximately about 3 percent to approximately about 50 percent of an original height of said head of said damper.

12. The hard disk drive of claim 10, with said head having a height that is compressed when said cover is attached to said base to enclose said voice coil motor and said damper, said head of said damper being compressed in a range of approximately about 20 percent to approximately about 30 percent of an original height of said head of said damper.

13. The hard disk drive of claim 10, further comprised of said damper being integrally constructed as a unitary piece.

14. The hard disk drive of claim 10, further comprised of said damper being constructed of ethylene propylene diene terpolymer.

15. A hard disk drive, comprising: a chassis containing a voice coil motor, said chassis comprising:
    a cover; and
    a base coupled with said cover; said voice coil motor attached to said base, said voice coil motor comprising:
        an lower yoke attached to said base; and
        an upper yoke maintained above said lower yoke in a spaced apart relation, said upper yoke having a bore; and
    a damper engaged with said bore of said upper yoke of said voice coil motor for maintaining tight contact between said cover and said upper yoke, said damper comprising:
        a head having a semi-spherical shape, said head contacting both an upper surface of said upper yoke and an inner surface of said cover;
        a body attached to said head and engaged with said bore; and
        a cone shaped lower portion protruding between said upper yoke and said lower yoke.

16. The hard disk drive of claim 15, with said head having a height that is compressed when said cover is attached to said base to enclose said voice coil motor and said damper, said head of said damper being compressed in a range of approximately about 3 percent to approximately about 50 percent of an original height of said head of said damper.

17. The hard disk drive of claim 15, with said head having a height that is compressed when said cover is attached to said base to enclose said voice coil motor and said damper, said head of said damper being compressed in a range of approximately about 20 percent to approximately about 30 percent of an original height of said head of said damper.

18. The hard disk drive of claim 15, further comprised of said damper being integrally constructed as a unitary piece.

19. The hard disk drive of claim 15, further comprised of said damper being constructed of ethylene propylene diene terpolymer.

20. The hard disk drive of claim 15, with said head having a height that is compressed when said cover is attached to said base to enclose said voice coil motor and said damper, said head of said damper being compressed in a range of approximately about 3 percent to approximately about 50 percent of an original height of said head of said damper.

21. The hard disk drive of claim 15, with said head having a height that is compressed when said cover is attached to said base to enclose said voice coil motor and said damper, said head of said damper being compressed in a range of approximately about 20 percent to approximately about 30 percent of an original height of said head of said damper.

22. The hard disk drive of claim 15, further comprised of said damper being integrally constructed as a unitary piece.

23. The hard disk drive of claim 15, further comprised of said damper being constructed of ethylene propylene diene terpolymer.

24. A hard disk drive, comprising:

a chassis containing a voice coil motor, said chassis comprising:
- a cover; and
- a base coupled with said cover; said voice coil motor attached to said base, said voice coil motor comprising:
    - an lower yoke attached to said base; and
    - an upper yoke maintained above said lower yoke in a spaced apart relation, said upper yoke having a bore; and
- a damper engaged with said bore of said upper yoke of said voice coil motor for maintaining tight contact between said cover and said upper yoke, said damper comprising:
    - a head having a semi-spherical shape, said head contacting both an upper surface of said upper yoke and an inner surface of said cover;
    - a body attached to said head and engaged with said bore, said body having a cylindrical shape; and
    - at least one circumferential groove along a lower portion of said body.

* * * * *